United States Patent [19]

Halberg

[11] 3,999,447
[45] Dec. 28, 1976

[54] OFFSET DRIVE TRANSFER MECHANISM

[75] Inventor: Robert W. Halberg, Muncie, Ind.

[73] Assignee: Borg-Warner Corporation, Chicago, Ill.

[22] Filed: Dec. 23, 1974

[21] Appl. No.: 535,534

[52] U.S. Cl. .................. 74/701; 74/217 R
[51] Int. Cl.² .......................... F16H 37/08
[58] Field of Search ....... 74/665 GE, 217 R, 217 S, 74/701, 700, 694

[56] References Cited

UNITED STATES PATENTS

| | | | |
|---|---|---|---|
| 1,348,183 | 8/1920 | Rayfield | 74/242.16 |
| 2,500,168 | 3/1950 | Du Pont | 74/665 GE |
| 2,510,697 | 6/1950 | Jacoby | 74/217 R |
| 2,630,719 | 3/1953 | Humbert et al. | 74/665 X |
| 3,221,574 | 12/1965 | Sampietro et al. | 74/665 |

Primary Examiner—Samuel Scott
Assistant Examiner—Wesley S. Ratliff, Jr.
Attorney, Agent, or Firm—Julian Schachner

[57] ABSTRACT

An offset drive transfer mechanism incorporated in a multiple path drive system for a vehicle having plural pairs of traction wheels, the mechanism being a transfer case disposed between a source of input torque and at least a pair of drive axles, each associated with a pair of traction wheels. The transfer case includes an input member and a pair of parallel drive trains including a relatively low-speed high-torque gear drive train and a relatively high-speed low-torque chain drive train, and means for selectively engaging one of said drive trains as desired to provide power transfer as desired in either condition.

3 Claims, 3 Drawing Figures

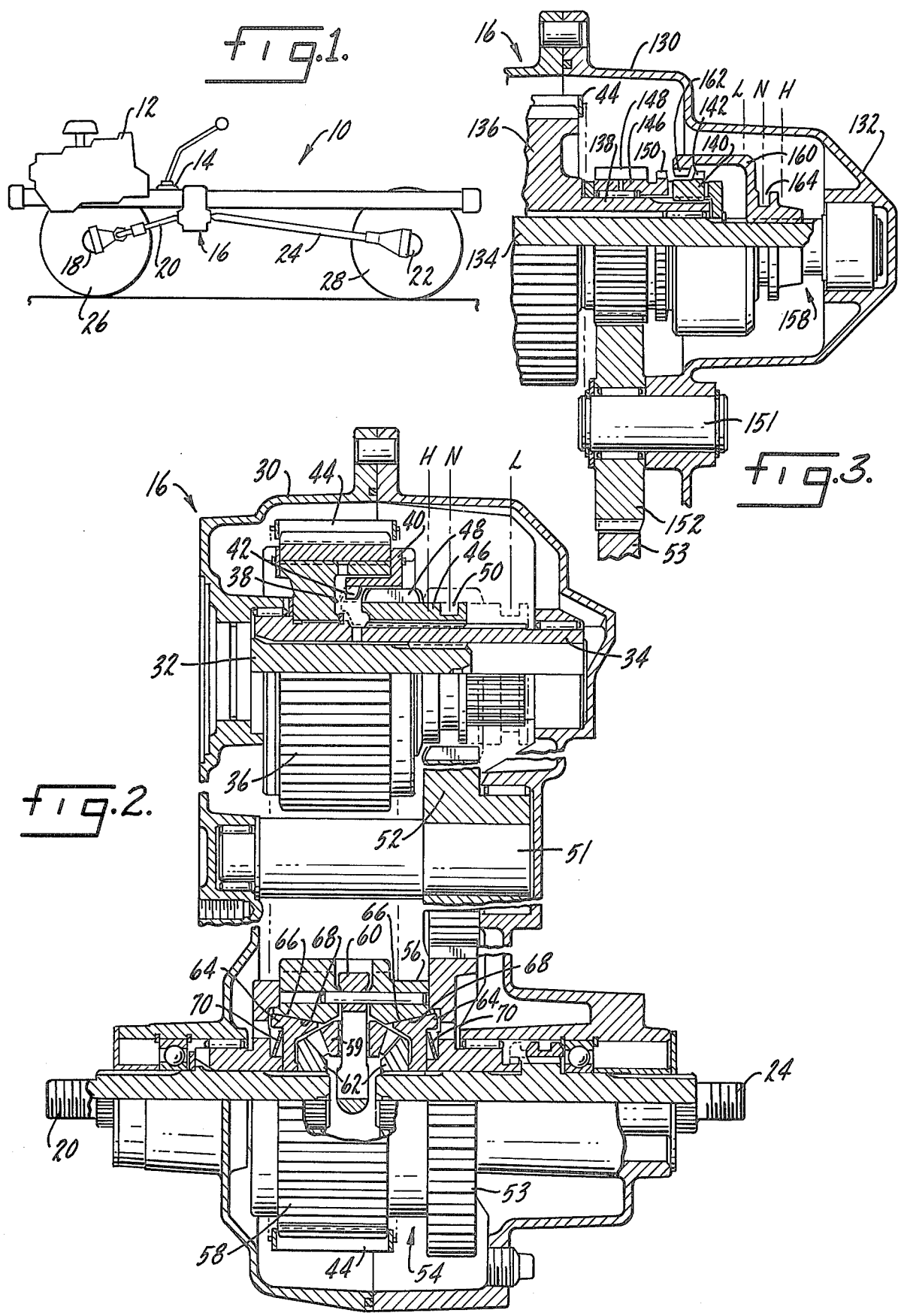

OFFSET DRIVE TRANSFER MECHANISM

BACKGROUND OF THE INVENTION

1. Field of the Invention

This invention relates generally to a torque transfer mechanism adapted to be incorporated in a multiple path drive system, for example, a four-wheel drive vehicle. More particularly, it relates to a system including an offset torque transfer case adapted to receive torque from a prime mover and to transmit torque to a plurality of drive axles.

2. Description of the Prior Art

In recent years there have been many improvements in automotive drive trains including improvements related to the transfer of torque from a prime mover to one or more drive axles. There has been a need to provide an improved torque transfer mechanism for establishing desirable low-speed high-torque and high-speed low-torque drive paths in four-wheel drive vehicles. At the same time there has been a need to provide such a mechanism which could be fabricated economically, and which would be quiet and efficient in operation.

Early torque transfer mechanisms generally provided only a rear wheel drive in the high-speed low-torque range, and a locked four-wheel drive in the low-speed high-torque range. Both ranges were generally gear drive trains which could be selectively engaged as desired. These gear drive trains were generally of heavy duty construction.

Later torque transfer mechanisms incorporated a center differential, which permitted four-wheel drive in both ranges, a chain drive train which could be engaged for direct drive and a gear drive train with which it could be engaged in series to provide reduction ratio torque. With the reduction, the chain carried the full torque load put through the mechanism. While normally, skid torque was the practical maximum limit for transfer through the chain drive train, under certain conditions an overload, possibly damaging to the chain, was possible.

Accordingly, it is an object of this invention to meet the continuing need and desire in the art for improvements in torque transmission by providing an improved torque transfer mechanism including parallel low-speed high-torque and high-speed low-torque drive paths, which has quiet operating characteristics, is efficient through a wide operating range, and is simple and economical to manufacture, operate and maintain. By providing parallel gear and chain drive trains, this invention allows flexible application of the improved torque transfer mechanism to vehicles with varied power requirements, and does so in a simple and economical manner.

SUMMARY OF THE INVENTION

This invention is directed in brief to an improved torque transfer mechanism for use between a prime mover and a pair of drive axles. The torque transfer mechanism provides parallel paths for the transfer of torque, which paths may be selectively engaged to effect either low-speed high-torque or high-speed low-torque power transfer.

The parallel drive paths incorporated within the torque transfer mechanism include a gear drive train for providing low-speed high-torque power transfer directly to the drive axles, bypassing a chain drive train. The chain drive train provides high-speed low-torque power transfer. Preferably, the gear drive train provides reduction ratio torque, while the chain drive provides substantially direct drive. Suitable means are provided for effecting selective engagement of one of the parallel paths through either drive train to establish the desired torque transfer condition. In one form of the invention, one of the gears is movable to effect the selective engagement. In another form of the invention, a suitable jaw clutch is provided for effecting the selective engagement.

By providing parallel gear and chain drive trains, the chain drive is relieved of high-torque loading during low range operation, thereby eliminating the possibility of chain overloads. This improves durability and allows application to larger, more powerful vehicles.

BRIEF DESCRIPTION OF THE DRAWING

The objects and advantages of this invention will become apparent to those skilled in the art upon careful consideration of the specification herein including the drawing wherein:

FIG. 1 is a schematic view of an automotive vehicle embodying the torque transfer mechanism;

FIG. 2 is a sectional view of one embodiment of the invention showing details of the torque transfer mechanism; and FIG. 3 is a partial sectional view similar to FIG. 2 showing details of another embodiment of the invention.

While this invention is susceptable of embodiment in many different forms, there is shown in the drawing and will herein be described in detail a preferred embodiment and an alternative embodiment with the understanding that the present disclosure is to be considered as an examplification of the principles of the invention and is not intended to limit the invention to these embodiments.

DESCRIPTION OF THE PREFERRED EMBODIMENT

Referring now to the drawing in greater detail, there is shown a four-wheel drive automotive vehicle 10 with which the torque transfer mechanism of the present invention is particularly useful. Vehicle 10 includes a prime mover 12 and a suitable transmission 14. A torque transfer mechanism 16 is provided to transmit torque from prime mover 12 through transmission 14 to a front drive axle assembly 18 through a suitable drive shaft 20, and to a rear drive axle assembly 22 through a suitable drive shaft 24. Drive axle assemblies 18 and 22 are adapted to drive the front and rear pairs of traction wheels 26 and 28, respectively.

Turning now to FIG. 2 in which one embodiment of the torque transfer mechanism 16 is shown, the torque transfer mechanism 16 includes a housing 30. An input shaft 32 is driven, for example, by transmission 14. A drive sleeve 34 is mated with shaft 32 by a suitable spline so as to be driven thereby. Sleeve 34 is rotatably secured within housing 30 by a pair of spaced bearings.

A sprocket 36 is carried by sleeve 34 for rotation therewith. Sprocket 36 defines an inwardly facing chamber 38 and a side element 40 extending into chamber 38 and defining inwardly facing teeth 42 therein. A chain 44 is driven by sprocket 36 upon rotation thereof.

A drive gear 46 is splined to sleeve 34 for rotation therewith and for sliding movement therealong. Gear 46 defines suitable teeth 48 adapted for mating engagement with teeth 42 of sprocket 36 upon movement of gear 46 to the high range position, that is leftwardly to the position shown by the dashed lines in FIG. 2. In the high range position drive is from shaft 32 through sleeve 34 and gear 46 to sprocket 36.

Gear 46 defines an annular groove 50. Suitable means, such as for example a fork or tyne, rides in groove 50 and is movable to slide gear 46 relative to sleeve 34. Gear 46 is slidable from the neutral position shown by the solid lines in FIG. 2 in the leftward direction to the high range position. Gear 46 is also slidable in the rightward direction to the low range position, also shown by dotted lines.

A suitable shaft 51 supports an idler gear 52 for rotation within housing 30. Gear 52 is in mesh with gear 46 when gear 46 is in the low range position so as to provide a driving relationship from gear 46 to gear 52.

Front drive shaft 20 and rear drive shaft 24 are rotatably supported by housing 30 and extend therefrom into driving engagement with front drive axial assembly 18 and rear drive axial assembly 22, respectively.

In certain instances relative rotation between drive shafts 20 and 24 is desirable, and indeed is necessary. To effect this relative rotation, a suitable differential mechanism is provided within housing 30. FIG. 2 shows an embodiment of a limited slip differential sometimes referred to as a reverse cone clutch type. The details and operation of the limited slip differential using the reverse cone structure are shown and described in applications of Jack F. Engle, Ser. No. 842,182 filed July 16, 1969 and Ser. No. 367,669 filed June 6, 1973. The Engle applications are co-pending and of common assignee herewith, and are incorporated herein by reference. Briefly, such a differential includes preloaded conical friction members which retard differential action and means to proportionately decrease rather than increase the frictional preload force in response to increasing input torque.

Such a differential is generally designated 54 and is shown in operative association with output shafts 20 and 24 which extend therefrom.

Differential 54 includes a casing 56 defining a sprocket 58 in alignment with sprocket 36 and engaged by chain 44 in such a manner that torque may be transferred from sprocket 36 to sprocket 58 and thus to casing 56 of differential 54.

Casing 56 also defines a gear 53 in meshing relationship with gear 52. Thus torque may be transmitted from gear 46 through gears 52 and 53 to casing 56 of differential 54.

It should be noted that parallel torque transfer paths are provided from input shaft 32 to the differential 54 and thus to output shafts 20 and 24. A first path is established when gear 46 is in the low range position. In this position a gear train includes gears 46, 52 and 53. Torque is transferred from input shaft 32 through sleeve 34 and the gear train to casing 56 of differential 54.

A second path is established when gear 46 is moved to the high range position. A chain drive train including sprocket 36, chain 44 and sprocket 58 is activated when teeth 48 mesh with teeth 42. In this position, torque is transferred from input shaft 32 through sleeve 34, gear 46 and the chain drive train to casing 56 of differential 54.

Gear 53, rather than gear 46, could be made movable to shift between the low and high range positions. In such a case, gear 53 would be movable between a low range position engaging the gear train with casing 56 and a high range position engaging sprocket 58 with casing 56.

A plurality of pinion gears 59 are rotatably supported by a pinion pin 60 which in turn is suitably secured to casing 56 for rotation therewith. A pair of side gears 62 are carried by shafts 20 and 24, respectively for rotation therewith. Side gears 62 are in constant mesh with pinion gears 59.

The teeth of gears 59 and 62 are constructed and arranged such that transmission of torque from casing 56 to shafts 20 and 24 results in a substantial axial force component upon the side gears in a direction parallel to shafts 20 and 24 and outwardly from the center of differential 54.

Rotation of casing 56 causes pinion pins 60 to revolve about the center line of shafts 20 and 24. Pinion gears 59 transcribe a generally circular path about the center line and, as they are in mesh with side gears 62, these side gears are caused to rotate and thereby transmit tortional effort to output shafts 20 and 24.

When it is necessary for shafts 20 and 24 to rotate at different speeds, pinion gears 59 not only revolve, but also rotate about pinion pins 60 thereby allowing relative rotation between side gears 62. Consequently, output shafts 20 and 24 rotate relative to each other as well as relative to casing 56.

Differentiation, that is relative rotation between shafts 20 and 24, is resisted by a pair of clutch members 64. Each clutch member 64 defines a frusto-conical surface 66 frictionally engageable with a complimentary frusto-conical surface 68 defined by casing 56. These frusto-conical surfaces tend to converge toward the center of differential 54.

As disclosed in detail by Engle, axial force upon each clutch member 64 is provided by a suitable spring pack 70 which may consist of spring type Belleville washers. Thus, clutch members 64 are held in constant contact with casing 56 with a predetermined force. The size and number of Belleville washers used in any particular application depend upon the amount of preload spring force needed or desired.

With differential 54 at rest, spring packs 70 urge clutch members 64 into contact with casing 56. This frictional contact provides initial tortional resistance or prevailing preload. This clutching action tends to drive shafts 20 and 24 in unison with casing 56. Upon rotation of casing 56, pinion gears 59 begin to revolve. However, as input torque is applied, force between the intermeshing teeth of pinion gears 59 and side gears 62 acts in opposition to the spring force provided by the initial tortional resistance. The force generated by the intermeshing teeth is proportional to the traction available at the wheels. This force, transmitted axially against clutch members 64 by side gears 62, results in proportional reduction of the total force holding the clutch members in contact. The force transmitted by the side gears reduces the contacting force of the clutch members, and therefore facilitates the taking place of the necessary differential action.

The tooth form used on gears 59 and 62 and the load of spring packs 70 is such that the force of spring packs 70 will always exceed the axial force transmitted by the teeth, even under conditions of maximum input torque to differential 54. Thus, clutch members 64 provide torque proportioned resistance for all conditions of operation of the differential.

Side gears 62 impose a variable force on clutch members 64 in opposition to spring packs 70, and therefore reduce the total clutch-engaging force in proportion to the torque transmitted through the differential.

Torque is transferred from a prime mover to an output, in this case a differential, through parallel paths, the first being a gear drive train providing a low-speed high-torque range and the second being a chain drive train providing a high-speed low-torque range. It is anticipated that the gear drive train will establish a reduction of two-to-one or more between the input and output, whereas the chain drive train will establish approximately a one-to-one or direct drive. This relieves the chain drive train of the high-torque load established during low range operations, preventing excessive chain loading and improving durability. Similarly, it lowers the manufacturing costs and in addition provides a space advantage.

DESCRIPTION OF AN ALTERNATIVE EMBODIMENT

In an alternative embodiment as shown in FIG. 3, torque transfer mechanism 16 includes a housing 130 having a housing extension 132. An input shaft 134 is rotatably supported within housing 130 and extension 132 and is adapted to be driven by transmission 14.

A sprocket 136, having an extension 138, is journalled on input shaft 134. A drive member 140 is splined to extension 138 for rotation therewith, and member 140 defines teeth 142.

A gear 146 is journalled on extension 138. Gear 146 defines teeth 148 and an upstanding set of teeth 150 spaced therefrom.

A suitable shaft 151 is supported by housing 130. Journalled on shaft 151 is an idler gear 152 in meshing relationship with gear 146 and with gear 53 defined by differential casing 56.

A suitable jaw clutch 158 is splined to shaft 134. Clutch 158 defines an inwardly extending arm 160 defining inner teeth 162. Teeth 162 are adapted for selective engagement with teeth 142 of end member 140 and teeth 150 of gear 146, as desired.

Jaw clutch 158 defines an annular notch 164 which may be engaged, for example, by a fork or tyne to effect movement thereof from a neutral position to and between low and high range positions by sliding relative to sleeve 134.

As jaw clutch 158 is moved to the left, as shown in FIG. 3, the low range is established. Teeth 162 mesh with teeth 150 and drive from shaft 134 through jaw clutch 158 is established to drive gears 146, 152 and 53, thereby driving casing 56 of differential 54.

Similarly, movement of jaw clutch 158 to the right establishes the high range position. In this position teeth 162 mesh with teeth 142 to establish drive from shaft 134 through jaw clutch 158, end member 140, extension 138, sprocket 136, chain 44 and sprocket 58 to drive casing 56 of differential 54.

It will be seen that a compact and simple torque transfer mechanism has been provided which allows for parallel drive paths, either selectively engaged by a simple engaging mechanism.

Although the torque transfer mechanism has been disclosed herein in conjunction with a particular differential, it should be understood that it may be used with other differential mechanisms, biased or unbiased, or indeed in assemblies not incorporating differential mechanisms.

It should be understood that while some embodiments of the invention have been shown and described, they should be considered as illustrative and may be modified by those skilled in the art without departing from the scope thereof, which is to be limited only by the claims herein.

I claim:

1. In a four-wheel drive vehicle having a first drive element in driven relationship with a prime mover and a pair of second drive elements each in driving relationship with a respective drive axle; the improvement comprising a torque transfer mechanism including a housing, input drive means in said housing and coupled with said first drive element for receiving power therefrom, output drive means in said housing and coupled with said second drive elements for transmitting power thereto, a gear drive train in engagement with one of said drive means and engageable with the other of said drive means for low-speed high-torque power transfer therebetween, a chain drive train in engagement with one of said drive means and engageable with the other of said drive means for high-speed low-torque power transfer therebetween, and means for effecting selective engagement of said drive trains respectively with said other of said drive means, said output drive means including a differential, and each of said drive trains being in driving engagement with said differential.

2. A torque transfer mechanism for delivering torque to each of two axles; said mechanism comprising a housing, input shaft means in said housing, differential means in said housing including a differential case and two output shafts, a gear drive train including a first gear splined to said input shaft means, a second gear, and a third gear on said differential case, and a chain drive train including a first sprocket on said input shaft means, a second sprocket on said differential case, and a chain coupling said sprockets, said first gear being slidable along said input shaft means between a low range position meshing with said second gear and a high range position engaging said first sprocket.

3. A torque transfer mechanism for delivering torque to each of two axles; said mechanism comprising a housing, input shaft means in said housing, differential means in said housing including a differential case and two output shafts, a gear drive train including a first gear on said input shaft means, a second gear, and a third gear on said differential case, a chain drive train including a first sprocket on said input shaft means, a second sprocket on said differential case, and a chain coupling said sprockets, and jaw clutch means splined to said input shaft means and slidable therealong between a low range position engaging said first gear and a high range position engaging said first sprocket.

* * * * *